(12) United States Patent
Vazzano

(10) Patent No.: US 10,583,953 B2
(45) Date of Patent: Mar. 10, 2020

(54) S'MORES INGREDIENTS STORAGE CONTAINER WITH AIRTIGHT LID

(76) Inventor: Peggy Lynne Vazzano, Fountain Hills, AZ (US)

( * ) Notice: Subject to any disclaimer, the term of this patent is extended or adjusted under 35 U.S.C. 154(b) by 0 days.

(21) Appl. No.: 12/853,763

(22) Filed: Aug. 10, 2010

(65) Prior Publication Data
US 2011/0042382 A1 Feb. 24, 2011

Related U.S. Application Data

(60) Provisional application No. 61/274,409, filed on Aug. 17, 2009.

(51) Int. Cl.
*B65D 1/24* (2006.01)
*A47J 47/10* (2006.01)
*B65D 43/02* (2006.01)

(52) U.S. Cl.
CPC ........... *B65D 1/24* (2013.01); *A47J 47/10* (2013.01); *B65D 43/0218* (2013.01); *B65D 2543/00194* (2013.01); *B65D 2543/00296* (2013.01); *B65D 2543/00314* (2013.01); *B65D 2543/00518* (2013.01); *B65D 2543/00537* (2013.01); *B65D 2543/00555* (2013.01); *B65D 2543/00564* (2013.01); *B65D 2543/00842* (2013.01); *B65D 2543/00972* (2013.01)

(58) Field of Classification Search
CPC .............................. B65D 1/24; B65D 43/0218
USPC ......... 220/526, 507, 524, 556, 359.1, 359.4, 220/501, 523, 553, 915.1; 206/223, 541; 426/106
See application file for complete search history.

(56) References Cited

U.S. PATENT DOCUMENTS

| 3,258,369 | A | * | 6/1966 | Blaich | H01M 2/0439 220/378 |
| 3,487,972 | A | * | 1/1970 | Swett | B65D 1/36 220/526 |
| 5,027,972 | A | * | 7/1991 | Bartholomew | 220/526 |
| 5,503,858 | A | * | 4/1996 | Reskow | 426/119 |
| 6,131,760 | A | * | 10/2000 | Huang | 220/526 |
| 6,415,947 | B1 | * | 7/2002 | Kim | B29C 45/0025 220/326 |
| 7,326,428 | B2 | * | 2/2008 | Weir | 426/120 |
| 2004/0084464 | A1 | * | 5/2004 | Koo | B65D 43/0218 220/784 |
| 2007/0178194 | A1 | * | 8/2007 | Everard | 426/106 |
| 2008/0110911 | A1 | * | 5/2008 | Chen | 220/788 |

* cited by examiner

*Primary Examiner* — Fenn C Mathew
*Assistant Examiner* — Jennifer Castriotta
(74) *Attorney, Agent, or Firm* — Michael W. Goltry; Robert A. Parsons; Parsons & Goltry, PLLC

(57) ABSTRACT

A fixed three compartment food storage container for marshmallows, chocolate and graham crackers with a snap on lid with silicon seals around its perimeter and down its center to fit tightly on the containers base enabling a airtight effect on the entire container, enabling the large interior section to be airtight from the two smaller sections. The lid has folding flaps with protruding ridges on the underside, that when snapped down to the closed position, make contact with the lip on the containers base to hold the silicon seals firmly around the perimeter and on the containers center interior wall.

4 Claims, 2 Drawing Sheets

S'mores ingredients storage container with airtight lid

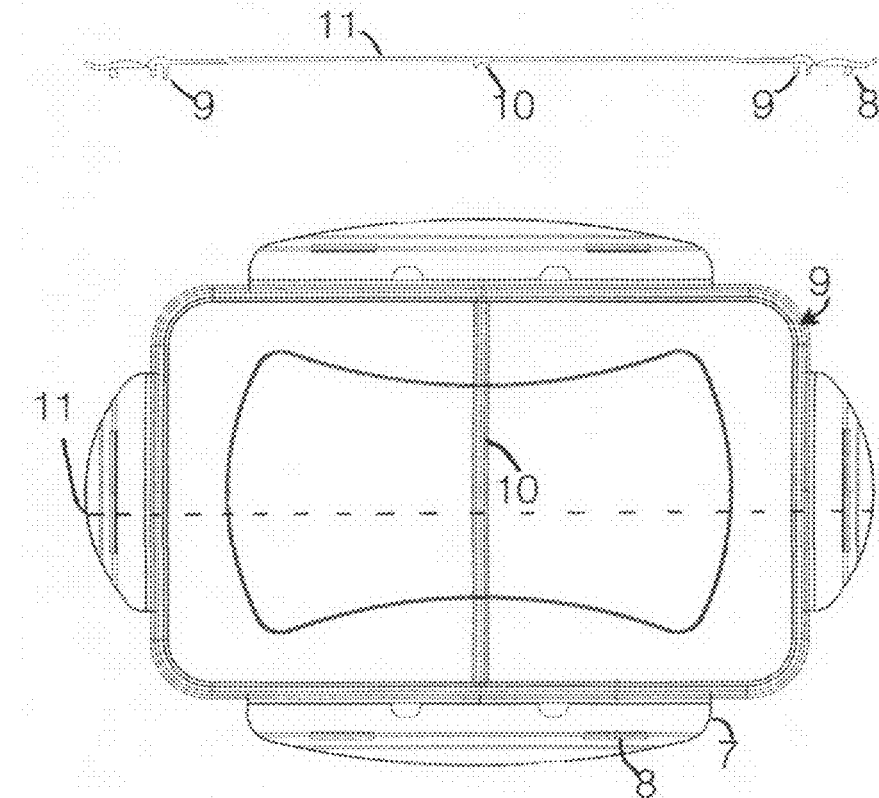
S'mores ingredients storage container with airtight lid

S'MORES INGREDIENTS STORAGE CONTAINER WITH AIRTIGHT LID

CROSS REFERENCE TO RELATED APPLICATION

This application claims benefit of U.S. Provisional application No. 61/274,409 filed on Aug. 17, 2009.

FIELD OF THE INVENTION

The present invention relates generally to food storage containers, particularly to compartmentalized containers with airtight sealed lids adapted for storing multiple items separated from each other within a single container.

BACKGROUND OF THE INVENTION

S'mores are extremely popular with campers or anyone sitting by a fireside. Most often consumers are sitting with not much light to see by. They fumble trying to open bars of chocolate or packages of graham crackers. Open bags of marshmallows can all to easily tip over and spill on the ground. A storage container to hold all of the ingredients would be desirable.

Various containers are available to hold multiple ingredients. However, when the s'more ingredients are stored together in a regular container, they do not stay fresh. The soft consistency of the marshmallows contaminate the graham crackers making them lose their crispness. Accordingly, it would be highly desirable to offer a container that is compartmentalized to hold the s'more ingredients and a airtight sealable lid that keeps the interior sections sealed separately for freshness.

SUMMARY OF THE INVENTION

The present invention provides a compartmentalized food storage container that allows for effective separation of ingredients within a single container, such as would be particularly advantageous for ingredients having different storage requirements (e.g., soft marshmallows vs. crisp crackers). Such a storage container is desirably designed and manufactured to retain ingredient freshness. In addition, the storage container of the present invention advantageously provides convenience and ease of use of ingredients. All ingredients are allowed to be stored in the container out of their original packaging.

The addition of a silicon seal in the center of the lids interior provides effective separation of ingredients and extended periods of freshness.

Accordingly, while my design is intended for the storage of S'mores ingredients, (e.g., marshmallows, chocolate and graham crackers) the consumer may wish to use it for any food storage purpose with the capability of keeping foods separate and fresh.

BRIEF DESCRIPTION OF THE DRAWINGS

The features and advantages of the present invention will become apparent upon reading the following description of the preferred embodiments taken in conjunction with accompanying drawings in which:

FIG. 3 is a cross sectional view of FIG. 1 through the length parallel to the long side that includes compartment 1 and compartment 3

FIG. 4 is a view of a storage container lid, showing flap and groove detail.

FIG. 5 is a enlarged detail view of FIG. 4, showing perimeter and center groove detail and flap ridge detail.

DETAILED DESCRIPTION OF THE PREFERRED EMBODIMENTS

Figure 1:
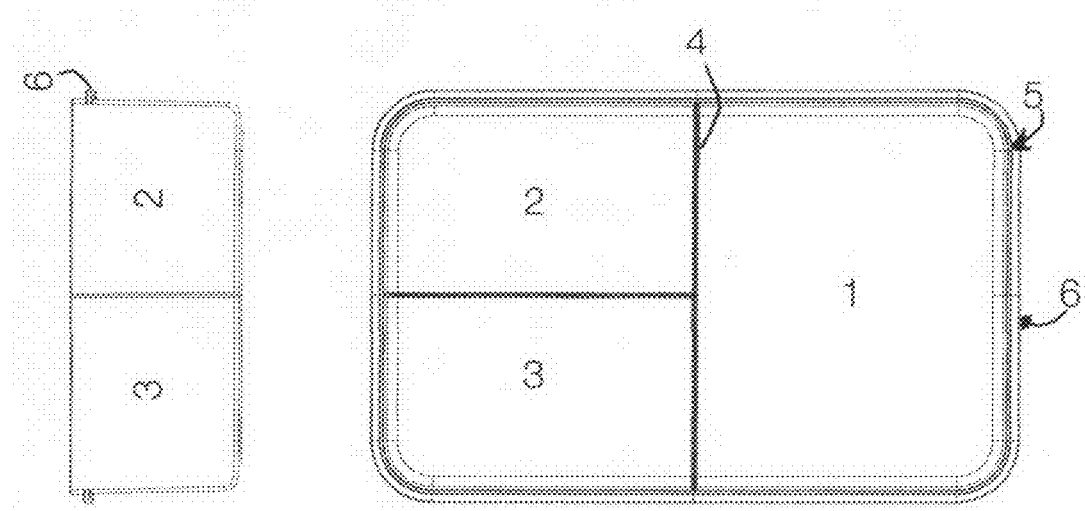
FIG. 1 is a interior top view of a storage container base, showing the 3 divided sections.

Referring to FIG. 1, there is shown a top view of a storage container base, having the interior divided into three fixed sections. Section 1 divides the base in half. Sections 2 & 3 divide the remaining half into two equal sections.

Referring to FIG. 1, storage container base center wall 4 is the exact height of the perimeter walls 5.

Referring to FIG. 1, storage container base has a protruding lip 6 around perimeter walls 5.

Figure 2:
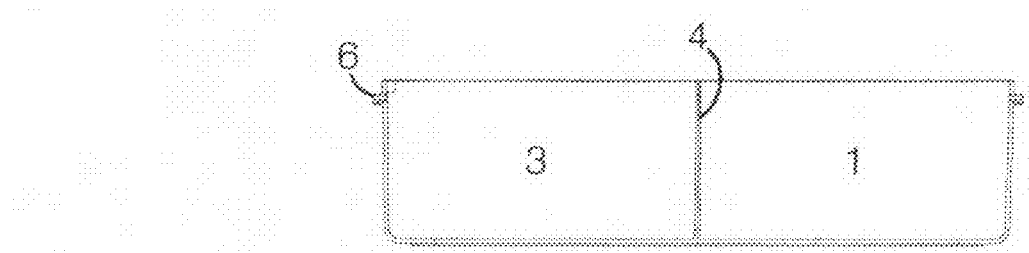
FIG. 2 is a exterior end view of FIG. 1

Referring to FIG. 2, there is shown a storage container base exterior end view. Shown are sections 2 & 3 of FIG. 1.

Referring to FIG. 2, there is shown is a side view of the exterior perimeter lip 6 of FIG. 1.

Referring to FIG. 3, there is shown a storage container base exterior side view. Shown are sections 1 & 3 of FIG. 1.

Referring to FIG. 3, There is shown the center wall 4 of FIG. 1 and the side view of the exterior perimeter lip 6 of FIG. 1.

Referring to FIG. 4, there is shown a storage container lid interior view. The lid has curvilinear folding flaps 7 on each lateral side. Each flap has small linear ridges 8 on the perimeter edge.

Referring to FIG. 4, there is shown the interior of the lid has a groove 9 that runs around the perimeter edge and down the lids center 10. A silicon strip is placed into the groove. When the lid is placed on the container base FIG. 1, the silicon strip abuts the top peripheral edge 5 of FIG. 1 container base and on the center dividing wall 4 of FIG. 1 container base. When the lid flaps are folded down to the close position, the ridges 8 on each flap 7 fit under the container base lip 6 of FIG. 1. This makes airtight seal around the entire perimeter of the storage container.

Referring to FIG. 4, there is shown the lids center groove 10. When a silicon strip is placed into groove 10 and the lid is placed on the storage container base FIG. 1 in the closed position, the silicon of groove 10 abuts the center wall 4 of FIG. 1. This then makes a airtight effect, sealing off FIG. 1 section 1 from sections 2 & 3.

Referring to FIG. 5, there is shown a enlarged section view 11 of the lids center in an side view, showing detail of groove and flap ridge.

A food storage container for the ingredients of S'mores, that being marshmallows, chocolate and graham crackers, comprising: a container of a rectangular shaped base, the interior portion configured into three permanently fixed sections, the interior portion is configured with a center wall across the width of said base, dividing said base interior in two equal sections, one section of said base interior portion is configured with a center wall across the length, dividing into two equal sections; said base interior portion center walls are configured to exact height of said base perimeter walls; said base perimeter walls are configured with a exterior lip around entire peripheral top edge; the lid is configured with curvilinear edge folding flaps at each lateral edge, each said flap has multiple linear ridges near flap perimeter on interior side, the lid is configured to make sealable contact with the peripheral top edge of said base and said flaps are configured that when folded down in closed position, said flap ridges engage with exterior peripheral lip; the lid is configured with a groove on the interior perimeter and down the center of width direction, a silicon strip is inserted in the interior of said groove; the lid is configured to have said groove with inserted silicon seal abut with the peripheral top edge and center interior wall of said container base to thereby seal the largest interior section from the two smaller interior sections of the said base; and a peripheral sealing surface on entire said container base.

The said silicon seal inserted in the lids center groove conforms to abut with said container base center wall and seal the peripheral edge of the largest interior section.

My design is a fixed three compartment food storage container with a airtight snap on lid. The lid is designed with a silicon seal around the entire outer edge. The lid has a additional silicon seal strip down the center, width direction. The containers base is divided in half with a center wall, width direction. One half of containers base is divided again in half, length direction. The base then has one large and two small sections. When the lid is attached to the base, the silicon seal rests on the outer walls and on the center dividing wall. When the lid is locked in place, it fits tightly to cause the entire container to be airtight. The additional center silicon seal keeps the larger section air tight from the two smaller sections.

1. My design is a fixed three compartment storage container with a airtight lid.
2. My design of this compartment storage container is for the specific purpose of storing the ingredients for the making of s'mores. S'mores ingredients are marshmallows, chocolate bars and graham crackers.

Although particular embodiments of the invention have been described in detail for the purposes of illustration and clarity of understanding, it will be apparent to those skilled in the art that many changes can be made in the embodiments described without departing from the scope of the invention. For example, various size modifications may be made without departing from the spirit of the invention.

Thus, the scope of the present invention should not be limited to the structures described herein, but only by the structures described by the language of the claims and the equivalents of those structures.

The invention claimed is:

1. A food storage container assembly for containing s'mores ingredients, consisting of:
   a food storage container to store s'mores ingredients, the food storage container includes an outside wall having a peripheral top edge, and a central dividing wall that divides the food storage container into compartments;
   a lid, the lid includes a center, a perimeter edge, and a groove, the groove runs along the perimeter edge and the center of the lid, and a silicon strip is placed in the groove;
   the food storage container is open opening the compartments, when the lid is in an open position detached from the food storage container;
   the food storage container is closed closing the compartments, when the lid is in a closed position attached to the food storage container; and
   the silicon strip of the lid concurrently abuts the peripheral top edge of the food storage container and the central dividing wall airtight sealing the compartments and airtight sealing one of the compartments from at least another one of the compartments for keeping foods placed in the compartments fresh, when the lid is in the closed position.

2. The food storage container assembly of claim 1 has locking flaps for locking the lid to the food storage container for unlocking the lid from the food storage container, when the lid is in the closed position.

3. A food storage container assembly for containing s'mores ingredients, consisting of:
   a food storage container to store s'mores ingredients, the food storage container includes an outside wall having a peripheral top edge, and a dividing wall that divides the food storage container into compartments including a marshmallow compartment, a graham cracker compartment, and a chocolate bar compartment, the dividing wall includes a central dividing wall dividing the marshmallow compartment from each of the graham cracker and chocolate bar compartments;
   a lid, the lid includes a center, a perimeter edge, and a groove, the groove runs along the perimeter edge and the center of the lid, and a silicon strip is placed in the groove;
   the food storage container is open opening the marshmallow, graham cracker, and chocolate bar compartments, when the lid is in an open position detached from the food storage container;
   the food storage container is closed closing the marshmallow, graham cracker, and chocolate bar compartments, when the lid is in a closed position attached to the food storage container; and
   the silicon strip of the lid abuts the peripheral top edge and the central dividing wall airtight sealing the marshmallow compartment from the graham cracker and chocolate bar compartments for keeping marshmallows, graham crackers, and chocolate bars in the respective marshmallow, graham cracker, and chocolate bar compartments fresh, when the lid is in the closed position.

4. The food storage container assembly of claim 3 has locking flaps for locking the lid to the food storage container and for unlocking the lid from the food storage container, when the lid is in the closed position.

* * * * *